(12) United States Patent
Alexander et al.

(10) Patent No.: US 10,770,956 B2
(45) Date of Patent: Sep. 8, 2020

(54) ELECTRIC MACHINE

(71) Applicant: Robert Bosch GmbH, Stuttgart (DE)

(72) Inventors: Marcus Alexander, Ludwigsburg (DE); Arndt Kelleter, Erdmannhausen (DE); Miguel Ruiz De Larramendi, Ludwigsburg (DE); Patrick Heuser, Stuttgart (DE); Mercedes Herranz Gracia, Forchheim (DE)

(73) Assignee: Robert Bosch GmbH, Stuttgart (DE)

( * ) Notice: Subject to any disclaimer, the term of this patent is extended or adjusted under 35 U.S.C. 154(b) by 443 days.

(21) Appl. No.: 15/525,551

(22) PCT Filed: Sep. 11, 2015

(86) PCT No.: PCT/EP2015/070789
§ 371 (c)(1),
(2) Date: May 9, 2017

(87) PCT Pub. No.: WO2016/074828
PCT Pub. Date: May 19, 2016

(65) Prior Publication Data
US 2017/0331353 A1    Nov. 16, 2017

(30) Foreign Application Priority Data

Nov. 13, 2014  (DE) .................... 10 2014 223 193
Feb. 2, 2015   (DE) .................... 10 2015 201 731

(51) Int. Cl.
*H02K 1/16*     (2006.01)
*H02K 1/26*     (2006.01)
(Continued)

(52) U.S. Cl.
CPC ........... *H02K 17/165* (2013.01); *H02K 1/165* (2013.01); *H02K 1/265* (2013.01); *H02K 17/12* (2013.01);
(Continued)

(58) Field of Classification Search
CPC ........ H02K 1/165; H02K 1/265; H02K 17/00; H02K 17/02; H02K 17/14; H02K 17/165; H02K 3/12; H02K 17/12; H02K 17/16
(Continued)

(56) References Cited

U.S. PATENT DOCUMENTS 4,780,635 A     10/1988  Neumann
4,831,301 A *   5/1989   Neumann ................ H02K 1/16
                                                      310/184

(Continued)

FOREIGN PATENT DOCUMENTS

| CN | 1980015 | 6/2007 |
| CN | 201113576 | 9/2008 |
| CN | 101416370 A | 4/2009 |
| CN | 102449887 A | 5/2012 |
| EP | 0314860 A1 | 5/1989 |
| EP | 2202871 | 6/2010 |

OTHER PUBLICATIONS

International Search Report for Application No. PCT/EP2015/070789 dated Feb. 5, 2016 (English Translation, 3 pages).

Primary Examiner — Quyen P Leung
Assistant Examiner — Eric Johnson
(74) Attorney, Agent, or Firm — Michael Best & Friedrich LLP

(57) ABSTRACT

The invention relates to an electric asynchronous machine (1), in particular an induction machine, comprising: —a cylindrical stator (2) with stator teeth (22) on a stator yoke (21), wherein a ratio between a yoke height (hy1) of the stator yoke (21) in the radial direction and a groove height (hn1) of the stator grooves (23) in the radial direction ranges from 1.75 to 2.5; —a cylindrical rotor (4) with poles (42) on a rotor yoke which are defined by short-circuit windings in a rotor body (41), wherein a ratio between the yoke height of the rotor body (41) in the radial direction and the groove height of the rotor grooves in the radial direction ranges from 2 to 2.75.

7 Claims, 2 Drawing Sheets

(51) Int. Cl.
*H02K 17/12* (2006.01)
*H02K 17/16* (2006.01)
*H02K 1/14* (2006.01)
*H02K 3/12* (2006.01)
*H02K 15/085* (2006.01)

(52) U.S. Cl.
CPC ............ *H02K 17/16* (2013.01); *H02K 1/146* (2013.01); *H02K 1/16* (2013.01); *H02K 1/26* (2013.01); *H02K 3/12* (2013.01); *H02K 15/085* (2013.01); *H02K 2213/03* (2013.01)

(58) Field of Classification Search
USPC .................... 310/216.036, 216.097, 216.112, 310/156.74–156.78
See application file for complete search history.

(56) References Cited

U.S. PATENT DOCUMENTS

| | | | |
|---|---|---|---|
| 5,045,742 A | 9/1991 | Armstrong et al. | |
| 5,804,895 A | 9/1998 | Takehara et al. | |
| 8,154,167 B2 | 4/2012 | Tang | |
| 2010/0141080 A1* | 6/2010 | Tang | H02K 1/165 310/216.111 |
| 2011/0198963 A1* | 8/2011 | Tang | H02K 3/28 310/208 |
| 2012/0267978 A1* | 10/2012 | Caruso | H02K 17/165 310/211 |
| 2017/0237324 A1* | 8/2017 | Terasawa | H02K 1/165 310/216.001 |

\* cited by examiner

ELECTRIC MACHINE

BACKGROUND OF THE INVENTION

The invention relates to electric machines, in particular asynchronous machines. In particular, the present invention relates to measures for increasing the performance of asynchronous machines at maximum rotational speed.

Electric machines generally comprise a stator and a rotor. In the case of asynchronous machines, the stator comprises a stator winding by means of which a circumferential stator magnetic field is produced. The circumferential stator magnetic field moves at a rotational speed that corresponds to the quotients of the basic frequency of the controlling driving system and the number of pole pairs of the electric machine.

In contrast to synchronous machines, the rotors of asynchronous machines comprise short-circuited conductors. As soon as the mechanical rotational speed of the rotor deviates from the synchronous rotational speed, the magnetic flux through the short-circuited conductors changes so that currents are induced therein. The induced currents produce an exciter magnetic field that interacts with the stator magnetic field and as a result produces a torque.

In contrast to synchronous machines, asynchronous machines have the advantage that permanent magnets not required. Therefore, due to the high level of reliability and the high degree of efficiency, said asynchronous machines are frequently used in the field that is relevant to the driving cycle as traction motors for motor vehicles driven by an electric motor, traction machines and similar vehicles.

The publication U.S. Pat. No. 8,154,167 B2 describes a highly efficient asynchronous machine having a high torque density and a high maximum rotational speed, wherein the stator yoke thickness is between 30% and 70% greater than the stator tooth length and the rotor yoke thickness is between 30% and 70% greater than the rotor tooth length.

The publication EP 2 202 871 A2 discloses an electric machine having a stator, wherein the ratio of a stator yoke thickness with respect to a stator tooth width can be at least 5:1 and the ratio of a rotor yoke thickness with respect to a rotor tooth width can be at least 5:1.

Because of the function they perform, asynchronous machines require a good electromagnetic coupling between the stator and the rotor. The proportion of the magnetic flux that is not interlinked by means of the stator and the rotor is referred to as the flux leakage and reduces the achievable torque of the electric machine. The reduction of the achievable torque is particularly high if the electric machine is operated at a voltage limit and at a maximum torque. This occurs in particular in the case of traction motors at high motor rotational speeds. The leakage of the magnetic flux then reduces the achievable torque at high rotational speeds so that high vehicle velocities cannot be maintained in the case for example of a strong wind resistance or on gradients, or acceleration processes are prolonged.

SUMMARY OF THE INVENTION

It is therefore the object of the present invention to provide an electric machine that comprises a highest possible performance at high rotational speeds without impairing characteristics in other operational regions.

This object is achieved by means of an asynchronous machine according to claim 1.

In accordance with one aspect, an electric asynchronous machine in particular an induction machine is provided, comprising:

a cylindrical stator having stator teeth that are arranged on a stator yoke;

a cylindrical rotor having rotor poles that are arranged on a rotor yoke and are defined by means of short-circuit windings in a rotor body, wherein a ratio of a yoke height of the stator yoke in the radial direction with respect to a slot height of the stator slots in a radial direction is between 1.75 and 2.5 and/or a ratio of the yoke height of the rotor body in the radial direction with respect to the slot height of the rotor slots in the radial direction is between 2 and 2.75.

The above asynchronous machine is dimensioned in such a manner that a particularly good electro-magnetic coupling between the stator and rotor is achieved. In particular, the flux leakage is significantly reduced by means of a design of the slot geometry. The shorter and wider a slot, the smaller the slot leakage. However, if the slot is wide, the cross-section of the teeth that are to produce the magnetic flux is reduced. This can lead to the reduction of the maximum torque at low rotational speeds. The above-mentioned asynchronous machine corresponds to a design, wherein the slot leakage is reduced but the maximum torque at low speeds is not impaired. Furthermore, the short slots that are specified by means of the above-mentioned design render it possible to increase the yoke width, which in turn leads to a magnetic unloading of the yoke.

In light of the above findings, a compromise arises as a result between the yoke height and the slot height of the stator at a ratio between 1.75 and 2.5 and/or a ratio of the yoke height with respect to the slot height in the rotor between 2 and 2.75. As a consequence, the leakage coefficient of the asynchronous machine reduces by up to 50% in contrast to conventional geometries.

It can be provided that a ratio of the slot widths of the region of the stator slot that is adjacent to a tooth tip of the stator slot with respect to the slot width at the slot base is between 0.9 and 1.1.

In accordance with one embodiment, the asynchronous machine can be embodied as a three-phase machine.

In particular, the asynchronous machine can comprise multiple three phase systems that are offset with respect to one another by 0° or 30°.

The short-circuit windings can be produced from aluminum, copper or a material having an even higher magnitude of conductivity.

Furthermore, the rotor body can be cooled by means of a flushing procedure using a cooling agent, in particular oil or air.

BRIEF DESCRIPTION OF THE DRAWINGS

The embodiments are further explained hereinunder with reference to the attached drawings, in which.

DETAILED DESCRIPTION

Figure 1:
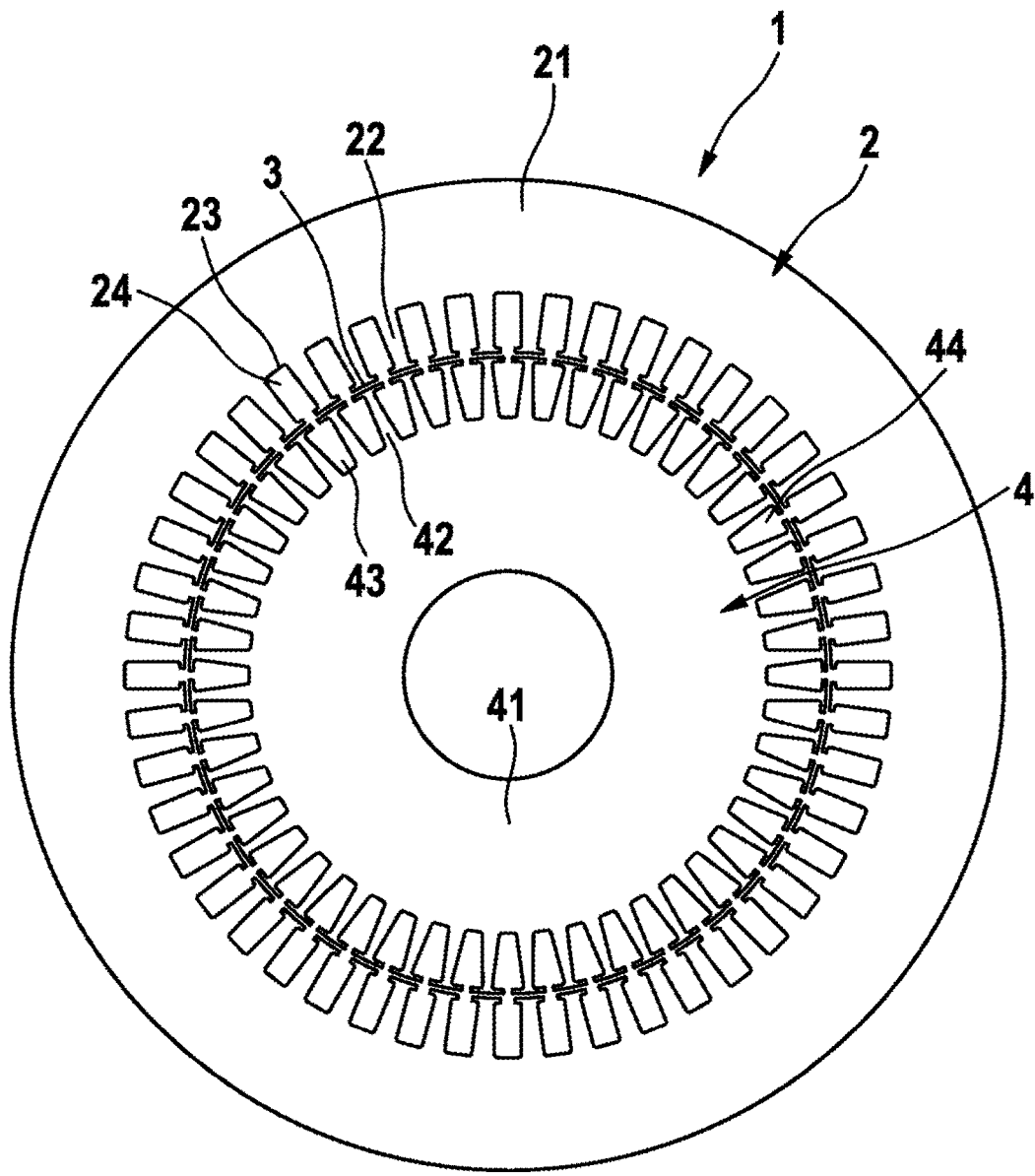
FIG. 1 illustrates a cross-sectional illustration through an asynchronous machine having improved performance at high rotational speeds.
Figure 2:
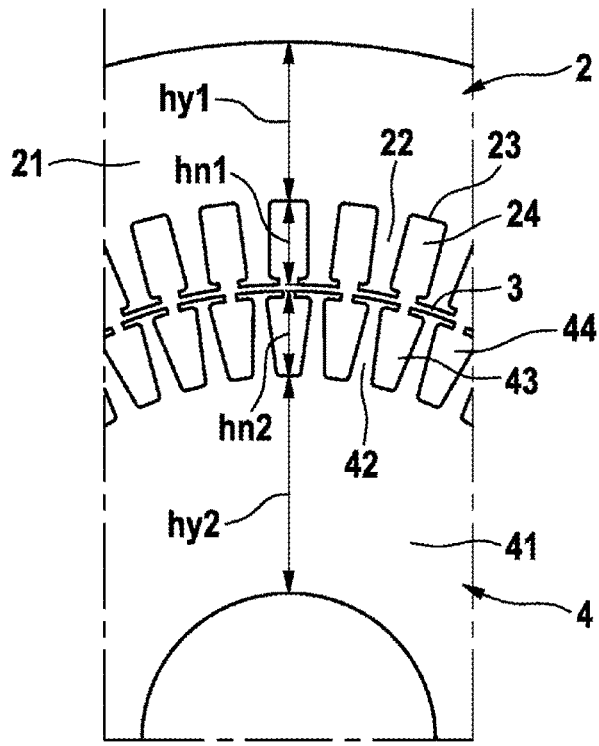
FIG. 2 illustrates a section of the asynchronous machine shown in FIG. 1 so as to illustrate the dimensions of the rotor and the stator.
Figure 3:
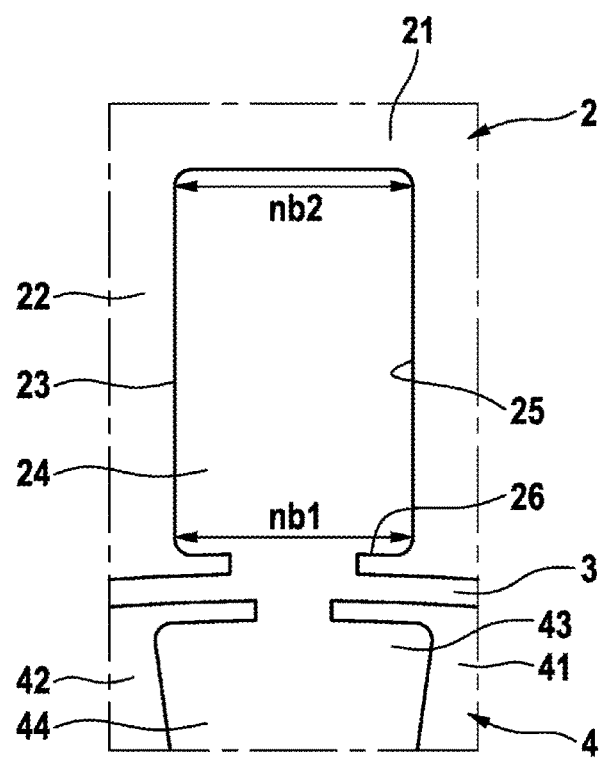
FIG. 3 illustrates a further sectional illustration of the asynchronous machine shown in FIG. 1 and illustrating the dimension of a stator slot.

FIG. 1 illustrates a cross-sectional illustration through a rotatory electric machine 1 having a stator 2 that is embodied as an outer stator. The electric machine is embodied as an asynchronous machine, in particular an induction machine.

The stator 2 is circular cylindrical and comprises a cylindrical stator yoke 21 and stator teeth 22 that adjoin the stator yoke 21. The stator teeth 22 protrude inwardly from the stator yoke 21 and thus define a circular cylindrical inner recess 3.

Stator slots 23 that are formed between the stator teeth 22 are suitably provided with stator coils 24 (not illustrated) that can generate a circumferential stator magnet field in the case of a corresponding electrical control procedure.

In the circular cylindrical inner recess 3, an essentially circular cylindrical rotor 4 is provided in the form of an inner rotor. The rotor comprises a rotor body 41. The rotor body 41 comprises rotor poles 42 that are provided between the short-circuit windings 43, said short-circuit windings being embedded in the rotor body 41 in the rotor slots 44. The short circuit windings 43 can be embedded directly in the rotor body, for example using a casting method, or can be inlaid in the rotor slots 44 of the rotor body 41. The rotor winding can also be inserted.

Because of the function they perform, asynchronous machines require a good electromagnetic coupling between the stator 2 and the rotor 4. The torque of the machine is reduced due to flux leakages, in other words magnetic fluxes that are not interlinked by means of the stator 2 and the rotor 2. The reduction of the torque then occurs in particular if the machine is driven at a voltage limit and with maximum torque. This is achieved by means of traction machines, in particular at high motor rotational speeds.

As the maximum torque at low rotational speeds is limited due to the thermal and magnetic limits of the materials used for the rotor, the maximum torque at high rotational speeds is almost exclusively limited by means of the magnetic leakage. It is fundamentally difficult to influence a magnetic leakage in the region of the winding head, which is arranged on the axial ends, and in the short-circuit rings by means of the electromagnetic design of the electric machine. Furthermore, it is possible to reduce a field leakage as a contribution to the total magnetic leakage by virtue of the fact that the number of the stator and rotor slots is sufficiently large.

The slot leakage represents a further contribution to the magnetic leakage and said slot leakage can be reduced by means of appropriately adjusting the slot geometries of the stator 2 and the rotor 4. In particular, it has been found that the shorter and wider a stator slot 23 is, the smaller the slot leakage. The same also applies to the rotor slots or the dimensions of the cross-section of the short-circuit windings 43.

However, wide slots have the disadvantage that the width of the teeth that are forming the slot and are to produce the magnetic flux is smaller, as a result of which the flux is limited and the maximum torque at low rotational speeds is limited. However, it is of advantage that short slots render it possible to increase the yoke width, which leads to a magnetic unloading of the yoke.

In particular, it has been found that, it is possible, by means of a particularly small magnetic leakage, in the case of a yoke height hy1 of the stator yoke 21 with respect to the radial slot height hn1 of the stator slots 23 of between 1.75 and 2.5, preferably between 2 and 2.25, to achieve particularly small slot leakages without noticeably limiting the maximum torque.

Furthermore, a ratio of a yoke height hy2 of the rotor body 41 in the radial direction with respect to the slot height hn2 of the rotor slots in the radial direction of between 2 and 2.75, preferably between 2.2 and 2.5, can likewise produce particularly small magnetic slot leakages. The slot height hn2 of the rotor slots essentially corresponds to the radial width of the short-circuit windings 43 in the rotor 4.

In particular, the combination of the above designs for the stator 2 and the rotor 4 render it possible to provide asynchronous motors having a significantly reduced slot leakage.

Stator slots 23 that are short in the radial direction cause the available slot surface to reduce in size. This can be compensated for by means of increasing the slot filling, in other words the proportion of the conductor cross-section that is located in the stator slot 23 in relation to the total cross-section surface of the stator slot 23. In particular, slot walls 25 of the stator slot 23 that is provided with stator coils are arranged essentially in parallel. As a result, it is possible to increase the slot filling of the stator slot 23 and consequently it is possible to compensate for the increased losses that can arise due to the shorter radial slot length of the stator slots 23.

In particular, the ratio at the slot width nb1 of the stator slot directly at the tooth tips 26 of the stator teeth 22 with respect to the slot width nb2 at the slot base should be between 0.9 and 1.1.

In particular, the asynchronous machine 1 can be embodied as a three-phase machine. Furthermore, multiple three-phase systems can be provided, said three-phase systems being offset with respect to one another by 0° or 30°. Multiple three-phase systems are expedient in the case of a single power converter being unable to supply the required current.

The invention claimed is:

1. An electric asynchronous machine (1), comprising:
a cylindrical stator (2) having stator teeth (22) that are arranged on a stator yoke (21); and
a cylindrical rotor (4) having rotor poles (42) that are arranged on a rotor yoke, said rotor poles being defined by short-circuit windings in a rotor body (41), wherein a ratio of a yoke height (hy1) of the stator yoke (21) in a radial direction with respect to a slot height (hn1) of stator slots (23) in the radial direction is between 1.75 and 2.5, and wherein a ratio of the yoke height of the rotor body (41) in the radial direction with respect to the slot height of the rotor slots in the radial direction is between 2 and 2.75.

2. The asynchronous machine (1) as claimed in claim 1, wherein a ratio of slot widths (nb1) of a region of the stator slots (23) that is adjacent to a tooth tip of the stator slot (23) with respect to a slot width (nb2) at a slot base is between 0.9 and 1.1.

3. The asynchronous machine (1) as claimed in claim 1, wherein the asynchronous machine is a three-phase machine.

4. The asynchronous machine (1) as claimed in claim 3, wherein the asynchronous machine comprises multiple three-phase systems that are offset with respect to one another by 0° or 30°.

5. The asynchronous machine (1) as claimed in claim 1, wherein the short-circuit windings are produced from aluminum, copper or a material having an even higher magnitude of conductivity.

6. The asynchronous machine (1) as claimed in claim 1, wherein the rotor body (21) is cooled by a flushing procedure using a cooling agent.

7. The asynchronous machine (1) as claimed in claim 1, wherein the rotor body (21) is cooled by a flushing procedure using oil or air.

\* \* \* \* \*